United States Patent [19]
Jambor et al.

[11] Patent Number: 6,039,383
[45] Date of Patent: Mar. 21, 2000

[54] ROOF CONSTRUCTION FOR A MOTOR VEHICLE

[75] Inventors: Arno Jambor, Vaihingen; Oliver Wagner, Filderstadt, both of Germany

[73] Assignee: DaimlerChrysler AG, Stuttgart, Germany

[21] Appl. No.: 08/917,730

[22] Filed: Aug. 27, 1997

[30] Foreign Application Priority Data

Aug. 27, 1996 [DE] Germany .......................... 196 34 510

[51] Int. Cl.[7] .................................................. B60J 7/08
[52] U.S. Cl. ................ 296/108; 296/107.07; 296/146.14
[58] Field of Search ........................ 296/107.07, 107.17, 296/108, 116, 117, 121, 122, 146.14

[56] References Cited

U.S. PATENT DOCUMENTS

| | | | |
|---|---|---|---|
| 2,762,648 | 9/1956 | Huzzard | 296/44 |
| 3,188,135 | 6/1965 | Bernstein et al. | 296/117 |
| 3,375,037 | 3/1968 | Hunt, Jr. | 296/117 |
| 4,784,428 | 11/1988 | Moy et al. | 296/107 |
| 4,852,935 | 8/1989 | Varner | 296/146 |
| 4,854,634 | 8/1989 | Shiraishi et al. | 296/108 |
| 5,050,663 | 9/1991 | Rhoads et al. | 160/231.2 |
| 5,246,262 | 9/1993 | Schrader et al. | 296/108 |
| 5,490,709 | 2/1996 | Rahn | 296/122 |
| 5,584,522 | 12/1996 | Kerner et al. | 296/37.16 |
| 5,647,630 | 7/1997 | Jambor et al. | 296/108 |
| 5,785,375 | 7/1998 | Alexander et al. | 296/108 |

FOREIGN PATENT DOCUMENTS

| | | |
|---|---|---|
| 332812 | 9/1989 | European Pat. Off. ............... 296/108 |
| 733380 | 10/1932 | France . |
| 44 38 190 C1 | 11/1995 | Germany . |
| 6-26930 | 11/1987 | Japan . |
| 8-175187 | 9/1994 | Japan . |
| 7-69071 | 3/1995 | Japan . |
| 7-215066 | 8/1995 | Japan . |

OTHER PUBLICATIONS

"The Idea Box", Automotive Industries, p. 52 titled 'Let the sun shine in!' by Giano Designs, Feb. 1990.
http://www.asahi–net.or.jp/~ut1j–tndu/testarossa.rqt1.html Ferrari Testarossa (1984–1991), Jan. 1999.
http://www.asahi–net.or.jp/~ut1j–tndu/f512m.rear.html Ferrari F512M (1994–1996), Jan. 1999.

*Primary Examiner*—D. Glenn Dayoan
*Assistant Examiner*—Paul Chenevert
*Attorney, Agent, or Firm*—Evenson, McKeown, Edwards & Lenahan, P.L.L.C.

[57] ABSTRACT

A convertible motor vehicle roof construction has the C-column sections arranged to project freely at least in their lowered inoperative position and at least along a portion of their length without any transverse connection. Control devices for the forward displacement of the rearward roof part in the longitudinal direction of the vehicle are provided so that, in the inoperative position, the C-column sections at least partially laterally flank a rear area of the vehicle interior.

8 Claims, 4 Drawing Sheets

ROOF CONSTRUCTION FOR A MOTOR VEHICLE

BACKGROUND AND SUMMARY OF THE INVENTION

This application claims the priority of German application 196 34 510.3, the disclosure of which is expressly incorporated by reference herein.

The present invention relates to a roof construction for a motor vehicle, particularly for a passenger car, having a dimensionally stable forward roof part which, in a closed operating position, adjoins a windshield frame of the vehicle body, and a dimensionally stable rearward roof part which forms the C-column sections and provided with a rear window. The roof parts are swivellably connected with one another and can be moved by a control mechanism between a lowered inoperative position and a closed operative position. The rearward roof part, in its lowered inoperative position, is swivelled about a horizontal transverse axis such that the rearward ends of the C-column sections, relative to the longitudinal direction of the vehicle, are aligned to project toward the front of the vehicle.

The Mercedes-Benz SLK roadsters uses a roof construction which has a forward, dimensionally stable roof shell which, in a closed operative position, is locked to a windshield cross member of the vehicle body. In the longitudinal direction of the vehicle toward the rear, the forward roof part is adjoined by a rearward roof part in the form of a dimensionally stable roof shell which is swivellably connected with the forward roof shell. The rearward roof shell has two C-column sections which laterally flank a rear window. In the area of the lower ends of the C-column sections, the rearward roof shell, swivellably about a vehicle-fixed swivel shaft extending transversely to the longitudinal direction of the vehicle, is disposed such that the rearward roof part is deposited in a lowered inoperative position in a storage space of the motor vehicle. Thereby, the C-column sections of the rearward roof shell project toward the front of the vehicle. The storage space is situated in a rear area of the vehicle body. When the roof construction is lowered, however, only an extremely small space remains for storing transported objects.

It is an object of the invention to provide a roof construction, therefore, to provide an increased storage space in a rear area of the motor vehicle.

This object has been achieved in accordance with the present invention by providing that the C-column sections at least in the lowered inoperative position and at least along a portion of their length, starting from the rearward ends thereof, project freely without any transverse connection. Control devices for forward displacement of the rearward roof part in the longitudinal direction of the vehicle are provided such that the C-column sections in the inoperative position at least partially laterally flank a rear area of the vehicle interior. As a result, the rearward roof part to which the forward roof part is linked, either during the lowering operation or after the lowering into the storage space, is additionally displaced toward the front by a certain amount. Consequently, in the rear area of the passenger car a storage space is available which is enlarged by the forward-displaced path of the roof construction.

Advantageously, the increased space is made available on both sides next to the rear area of the vehicle interior within the vehicle body. In an open (convertible) passenger car, such a space naturally often already exists as the result of a folding top compartment which is U-shaped (as viewed in a top view). Between the lateral end of the rear area of the vehicle interior as well as the body shell of the vehicle body, normally sufficient space will therefore be available in order to be able to displace the C-column sections of the rearward roof part and thus the whole roof construction toward the front. According to the invention, however, the rear window must be arranged between the C-column sections so that, at least in the lowered inoperative position, the C-column sections project freely along a portion of their length.

The foregoing characteristic according to the present invention is achieved either by providing a relatively short rear window which is recessed with respect to the ends of the C-column sections or detachably arranging the rear window on the rearward roof part and separating the rear window in a simple manner from the rearward roof part for the lowered inoperative position. Similarly, the rear window can be constructed along its length in two parts, with only the part situated between the rearward ends of the C-column sections removed or displaced during the lowering into the inoperative position.

Another feature of the present invention is a rear window used as a transverse connection in the area of the lower ends of the C-column sections and separably arranged on the rearward roof part with respect to the C-column sections. In this embodiment, the rear window can be disposed in an articulated manner on the rearward roof part and can be deposited jointly with the roof construction in the rear area of the vehicle body. Thereby, in the deposited inoperative position, the rear window takes up a position which releases the C-column sections. Alternatively, the rear window can be removed from the rearward roof part and can be stored separately with respect to the roof construction in the vehicle.

In a further embodiment of the present invention, the rear window is arranged on the rearward roof part while being at least partially recessed with respect to the C-column sections such that the C-column sections project freely along a portion of their length. In closed sports cars, e.g. a Ferrari, the rear window directly adjoins the rear area of the vehicle interior in a steeply upright position and the C-column sections are pulled farther toward the rear with respect to this rear window. The rearward roof part of the current convertible (open) passenger car is designed analogously in that the C-column sections are pulled farther toward the rear over the steeply aligned rear window relative to the closed operative position.

In yet a further embodiment of the present invention, the forward and the rearward roof part can be lowered from their closed operating position by an upper parallelogram linkage. The two lower bearing points of the upper parallelogram linkage are part of a lower guiding arrangement which is fixedly supported on the vehicle body and used as a control device. As a result, the lower bearing points, which are used as the basis, of the parallelogram linkage responsible for the lowering movement of the two roof parts can be displaced in a simple manner toward the front, whereby also the roof construction is displaced toward the front in the lowered inoperative position.

A still further embodiment of the present invention utilizes the lower guiding arrangement as a parallelogram linkage. This is a particularly simple solution for achieving a forward displacement of the roof parts.

Another embodiment of the present invention contemplates the upper and the lower parallelogram linkage being provided on both sides of the roof parts with identical linkage parts to which synchronizing devices are assigned for synchronizing their moving operations. This ensures a particularly good functional reliability of the parallelogram linkages.

In a further embodiment of the present invention, restricted guiding devices are provided between the upper and the lower parallelogram linkage for the synchronous superimposition of the movements of the two parallelogram linkages. Thereby, the time for a lowering operation or for a lifting operation of the roof construction is reduced because the lowering and the forward displacement of the roof construction can take place simultaneously.

In a further aspect of the present invention, a swivel lever arrangement is provided as a restricted guiding device which is applied to the rearward roof part and is fixedly disposed on the vehicle. The mechanically simple configuration permits a long and maintenance-free functional reliability. This feature is an advantage in comparison to other embodiments of the present invention which contemplate a corresponding tension device drive in the form of a chain drive or belt drive as the restricted guiding device. In the latter, a tensioning device must be assigned to compensate for elongation of the tension devices.

In a yet further aspect of the present invention, the swivel lever arrangement is provided as a driving part for the opening and closing movement of a covering flap provided for closing the storage space for the roof construction. As a result, the swivel lever arrangement has a double function. That is, it controls the covering flap and synchronizes the movements of the two parallelogram linkages. As a result, the swivel lever arrangement can be connected by way of corresponding kinematics or directly with the covering flap.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
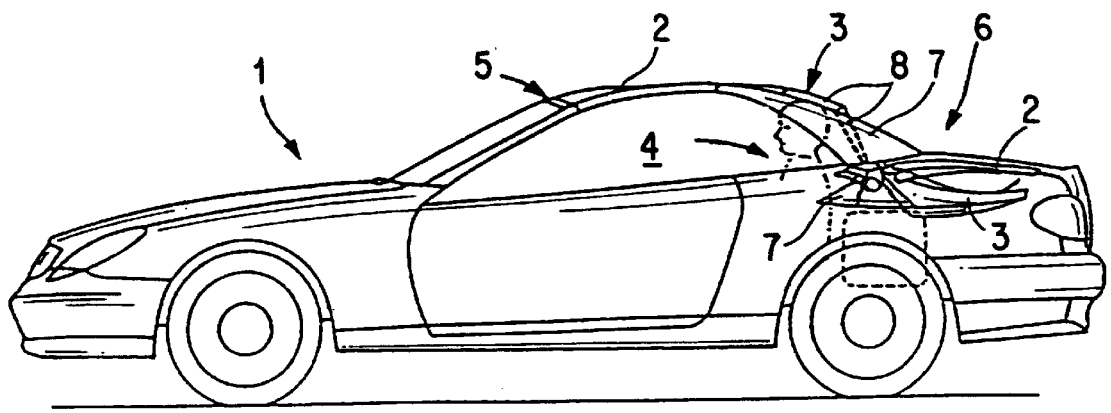
FIG. 1 is a side elevational view of an open or convertible passenger car equipped with an embodiment of a roof construction according to the present invention, in which the roof construction is shown both in its lowered inoperative position and in its closed operative position.

A passenger car designated generally by numeral 1 in FIG. 1 has a vehicle interior which is composed of a driver area and a rear area 4 and which is bounded toward the front by a windshield, two lateral A-columns of the vehicle body and a windshield cross member 5 which connects the two A-columns with one another above the windshield. Toward the top and toward the rear, the vehicle interior is bounded by a forward roof part 2 and a rearward roof part 3 which can be moved between an operative position closing the vehicle interior and an inoperative position lowered in the rear area of the passenger car.

Figure 4:
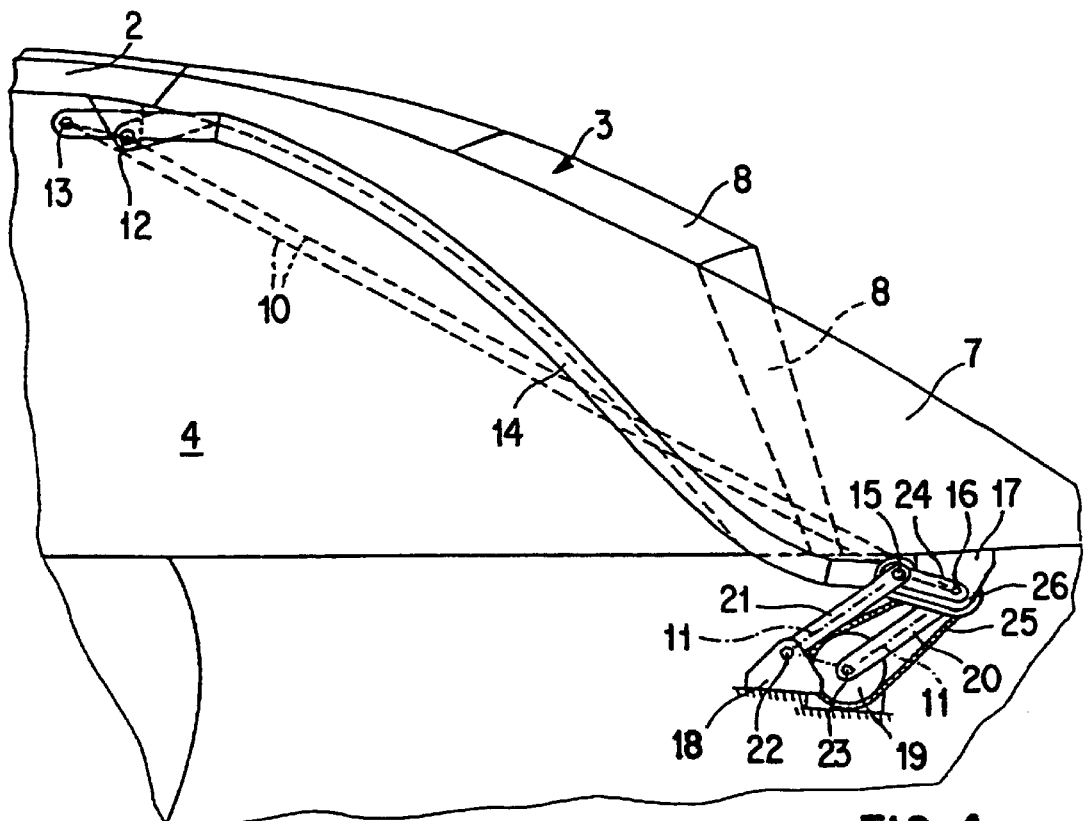
FIG. 4 is an enlarged view of a control mechanism for lowering and forward displacing the two roof parts of the roof construction of FIG. 1.
Figure 5:
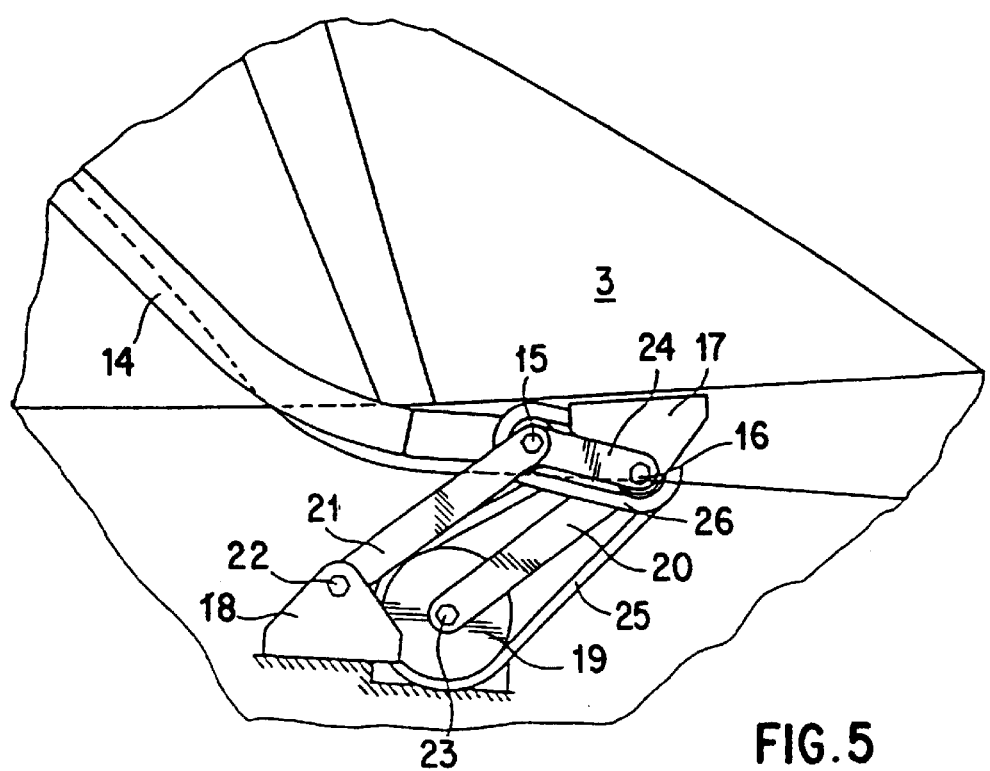
FIG. 5 is an enlarged representation of a lower parallelogram linkage of the control mechanism of FIG. 4 for the forward displacement of the folded roof construction.

The roof part 2 and the roof part 3 are constructed in a shell-type dimensionally stable manner of a corresponding plastic material or of pressed sheet metal parts. The forward roof part 2 adjoins the windshield cross member 5 and, in the closed operating position, is locking fixed thereto. The forward roof part 2 extends in the longitudinal direction of the vehicle toward the rear to approximately the height of the transition of the driver area to the rear area of the vehicle interior. In the longitudinal direction of the vehicle toward the rear, the forward roof part 2 is adjoined by the rearward roof part 3 which, by way of a hinge arrangement, swivellably about a horizontal swivelling axis 12 as seen in FIG. 4 which extends transversely to the longitudinal direction of the vehicle, is disposed on the forward roof part 2.

Roof part 3 has a roof area which adjoins the forward roof part 2 in a flush manner and which on both sides changes into C-column sections 7 which extend downward to a vehicle edge of the vehicle body. A rear window 8, which is stepped in the longitudinal direction of the vehicle extends between the two C-column sections 7 transversely along the width of the roof part 3. The lower pane portion of the window is "set" steeper with respect to the C-column sections 7. As a result, the lower ends of the C-column sections 7, while leaving a clearance adjoining the rear window 8 toward the rear, project between these in the closed operative position of the roof construction 2, 3 freely toward the rear area 6 to the rear. These lower ends of the C-column sections 7 therefore have fin-type or wedge-type constructions.

In order to lower the movable roof construction, specifically the roof parts 2 and 3, from their closed operative position, into the lowered inoperative position in the rear area 6 of the passenger car 1 as is also shown in FIG. 1, the locking of the forward roof part 2 on the windshield cross member 5 is first released. Then, a control mechanism and a driving unit, preferably a hydraulic unit, swivels the rearward roof part 7 toward the rear into a storage space of the rear area 6 about a horizontal swivelling axis which is provided in the area of the lower ends of the C-column sections 7 and extends transversely to the longitudinal direction of the vehicle. Simultaneously, the forward roof part 2 which is swivellably connected with the rearward roof part 3 is lowered by the control mechanism by a parallel displacement also into the rear area 6, whereby the forward roof part 2 is deposited in a folding-knife-type manner on the rearward roof part 3.

In its lowered inoperative position, the rearward roof part 3 is aligned such that the portion bordering the forward roof part 2 projects toward the rear and the C-column sections 7 project toward the front in the longitudinal direction of the vehicle. In addition, the entire roof construction deposited in the rear area 6 is displaced forward in the longitudinal direction of the vehicle by the control mechanism in a manner described below. Thereby, the rear window comes to rest on an end of the storage space directly adjoining the rear area 4 toward the rear, and the fin-type free lower ends of the C-column sections 7 extend at both sides of the rear area 4 in correspondingly forwardly continued sections of the storage space between the lateral shell of the vehicle body and the adjacent lateral wall of the rear area 4 of the vehicle interior toward the front.

This above-described additional forward displacement of the roof construction 2, 3, in the rear area 6 enlarges the opening remaining for the loading and unloading of cargo as well as the residual trunk space. In the embodiment according to FIGS. 1 and 4 to 7, the fin-type ends of the C-column sections 7 may extend laterally toward the front next to the rear area 4 because the rear window 8 is aligned relatively steeply and a clearance therefore remains between the lower ends of the C-column sections 7.

Figure 2:
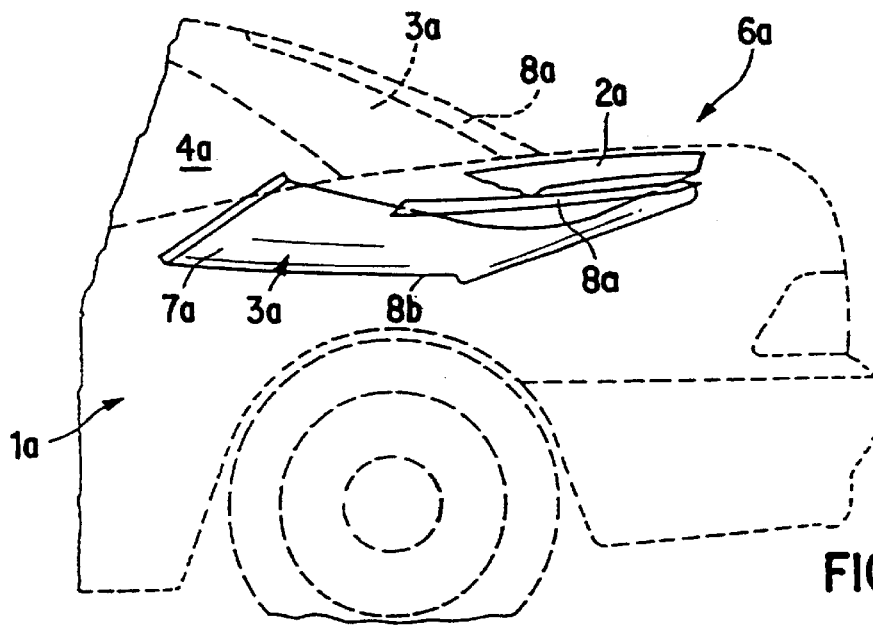
FIG. 2 is a view of another embodiment of the roof construction according to the present invention in which the rearward roof part is provided with a separably arranged rear window.
Figure 3:
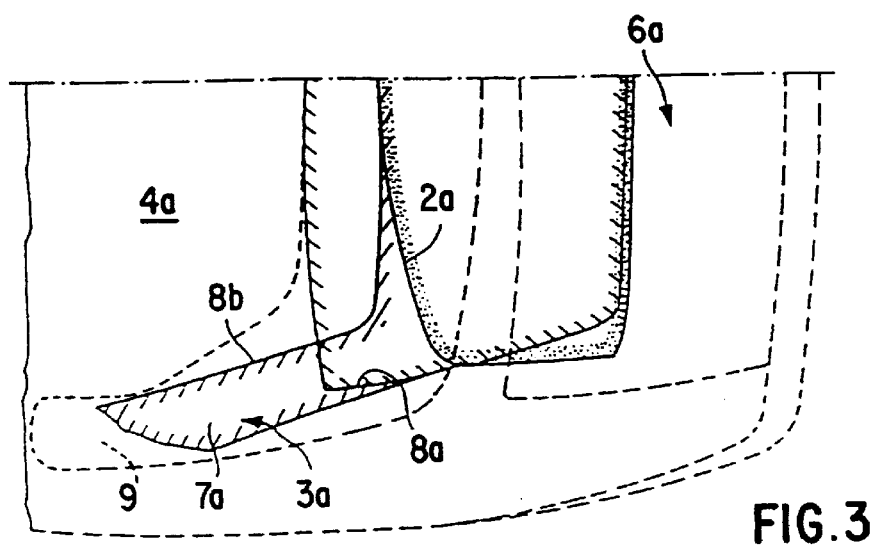
FIG. 3 is a schematic top view of the roof construction of FIG. 2 deposited in a rear area of the vehicle body.

In embodiment according to FIGS. 2 and 3, a rear window 8a of a rear roof part 3a ends in an aligned manner with the exterior shell of the rearward roof part 3a and extends to the lower ends of the assigned C-column sections of the rearward roof part 3a. In order to permit a lowering and forward displacing of the roof construction 2a, 3a analogously to the above-described control of the roof parts 2 and 3 according to FIG. 1, nevertheless in this embodiment of FIGS. 2 and 3, the rear window 8a is detachably arranged in a receiving section 8b of the roof part 3a between its two C-column sections. A suitable control mechanism connects the rear window 8a with the forward roof part 2a in an articulated manner and, during the lowering operation, detachs the rear window 8a from the receiving section 8b of the rearward roof part 3a so as to be deposited in the position illustrated in solid line in FIG. 2.

The rear window 8a can also be held without a connection to the forward roof part 2a, i.e., exclusively detachably in the receiving section 8b of the rear roof part 3a, so that the rear window 8a is removed before a lowering of the roof construction from the reward roof part 3a. After the lowering of the roof construction 2a, 3a, the rear window 8a can then be deposited separately in the storage space of the rear area 6a and can be positioned particularly according to FIGS. 2 and 3.

In the embodiment of FIGS. 2 and 3, the C-column sections in their lowered inoperative position project almost completely freely from the roof area of the rearward roof part 3a toward the front. Consequently, the amount of forward displacement of the roof construction 2a, 3a in the longitudinal direction of the vehicle toward the front can be dimensioned to be relatively large so that the C-column sections can be displaced relatively far into the lateral areas of a storage space closed off by a roof compartment cover 9. The control mechanism for the lowering and forward displacing of the roof construction 2a, 3a corresponds in all essential operating parts to the control mechanism for the roof construction 2, 3 according to FIGS. 1 and 4 to 7 described with reference now to FIGS. 4 to 7.

On the bottom side of the lower ends of the C-column sections 7, bearing blocks 17 are fixed to dispose the rearward roof part 3 swivellably about a horizontal swivelling axis which extends transversely to the longitudinal direction of the vehicle. Simultaneously, a parallelogram linkage 10, whose operating diagram is illustrated by a broken line, lowers the forward roof part 2 both together with and onto the roof part 3 with a parallel displacement which takes place rearwardly and downwardly. One parallelogram lever of the parallelogram linkage 10 is defined directly by the rearward roof part 3 and its upper bearing point 12 on the forward roof part 2. The other parallelogram lever of the parallelogram linkage 10 is formed by an S-shaped curved lever rod 14 which has on its lower hinge point a connection lever 24 is swivellably about a hinge axis 15 and on an upper hinge point 13 in a manner not shown connected with the forward roof part 2.

The connection lever 24, in turn, is part of a lower parallelogram linkage 11 whose operating sections are indicated by broken lines. In the area of its lower hinge points, i.e., in the area of its base, the lower parallelogram linkage 11 is fixedly disposed on the vehicle body so that the upper parallelogram linkage 10, by way of the lower parallelogram linkage 11, is fixedly disposed on the vehicle body. The parallelogram linkage 11 is formed by a parallelogram lever 20 which can be swivelled about a vehicle-body-fixed swivelling axis 23 and by a parallel parallelogram lever 21 which is disposed to be swivellable about another vehicle-body-fixed swivelling axis 22.

Figure 7:
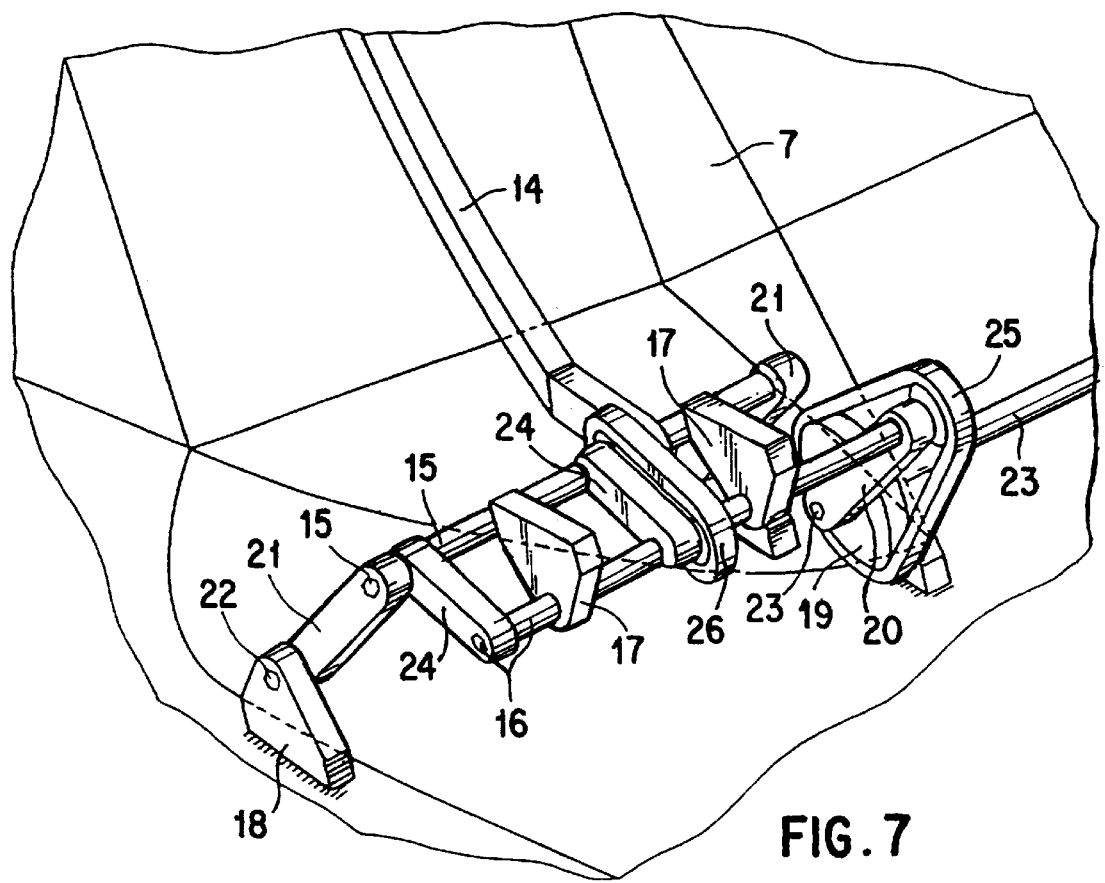
FIG. 7 is a perspective view of the control mechanism for the roof construction according to FIGS. 1 and 4 to 6.

The lower parallelogram linkage 11 causes displacement of the folded roof construction 2, 3 in the longitudinal direction of the vehicle, specifically for the lowered inoperative position in the longitudinal direction of the vehicle toward the front and for the repeated lifting into the closed operative position back into the longitudinal direction toward the rear. For stabilizing the individual parts of the control mechanism, the parallelogram levers shown in FIG. 7 are arranged on both sides of the lever 14 without, however, changing the above-described function. In order to synchronize the left part of the control mechanism illustrated in FIG. 7 with the identically constructed (mirror image) part on the opposite side, the swivelling axis 23 is equipped with a synchronizing shaft 23 provided with the same reference number which extends horizontally transversely along the vehicle width to the opposite parallelogram lever 20. The introduction of the driving force into the parallelogram lever 20 serving as the driving lever may take place by way of the synchronizing shaft 23.

A tension device drive which is used as a transmitting device, couples the two parallelogram linkages 10, 11 with one another such that their corresponding movements are superimposed. The tension device drive, which in the illustrated embodiment is a belt drive, has a disk 19 which is coaxial with respect to the swivelling axis 23, is fixedly held on the vehicle body and has a surrounding belt 25 on its circumference which rolls during a swivelling is movement of the parallelogram lever 20. The other end of the belt 25 encloses a disk wheel which is non-rotatably connected with the rotating shaft 16. A predetermined transmission ratio is defined between the disk wheel and the belt disk 19. As the result of the operation of the lever 20 by way of a conventional driving unit, the belt 25 rolls on the disk 19 and simultaneously, by way of the rotating shaft 16 and the bearing blocks 17, rotates the rearward roof part 3 from the closed operative position toward the rear.

A second belt drive 26 rolls on a disk wheel coaxial with respect to the small disk wheel of the belt drive 25, 19 and is non-rotatably arranged therewith on the rotating shaft 16 and rolls on a disk wheel fixed to the swivel lever 14. As a result, by the application of a torque in addition to the longitudinal force of the lever, 14 the swivel lever 14 is supported, whereby the upper parallelogram linkage, particularly in the area of its end positions in which it is situated close to the dead center position, is moved in a secure manner without the danger of a blocking. The second belt drive 26 has a transmission ratio of at least approximately 1:1. This transmission ratio depends on whether, by way of the belt drive, a torsional prestress is to be applied to the swivel lever 14. This prestress causes a facilitated swivelling-out of the forward roof part 2 from the near dead-center positions.

Figure 6:
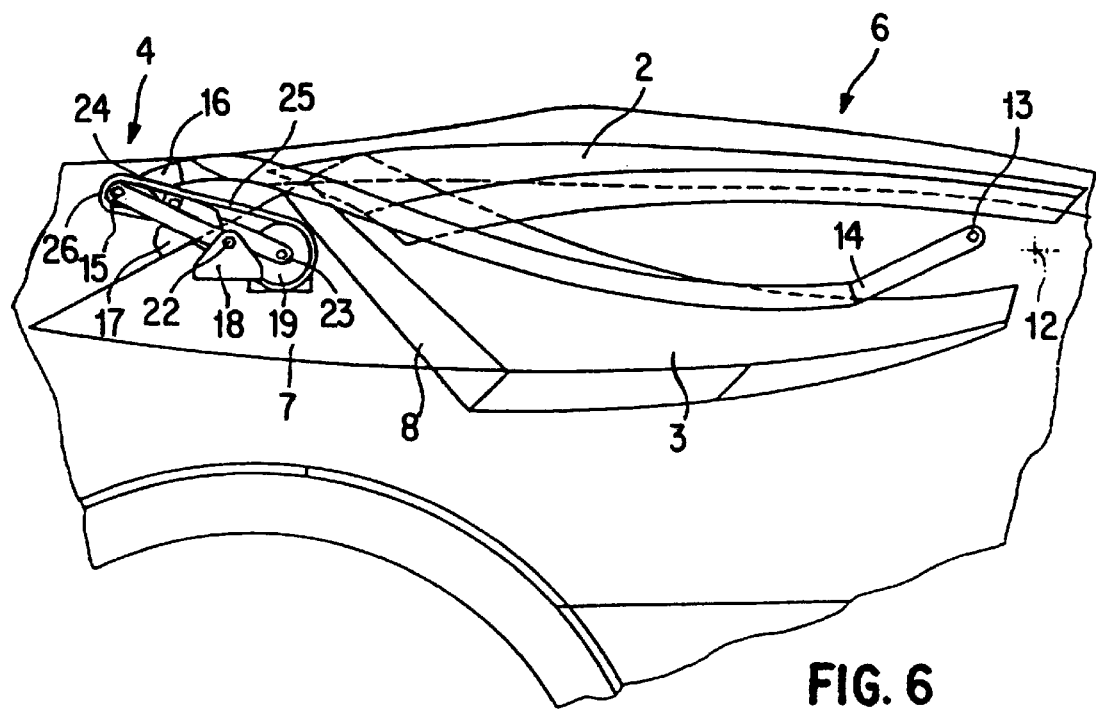
FIG. 6 is an enlarged view of the arrangement of the roof construction in a rear area of the passenger car in the lowered, forward-displaced inoperative position.

The two parallelogram linkages 10, 11 change the roof construction 2, 3 from the closed end position illustrated in FIG. 4 into the lowered and forward displaced inoperative position illustrated in FIG. 6. Correspondingly reversed control movements change the deposited roof construction 2, 3 from its lowered inoperative position back into the closed operative position of FIGS. 1 and 4.

Figure 8:
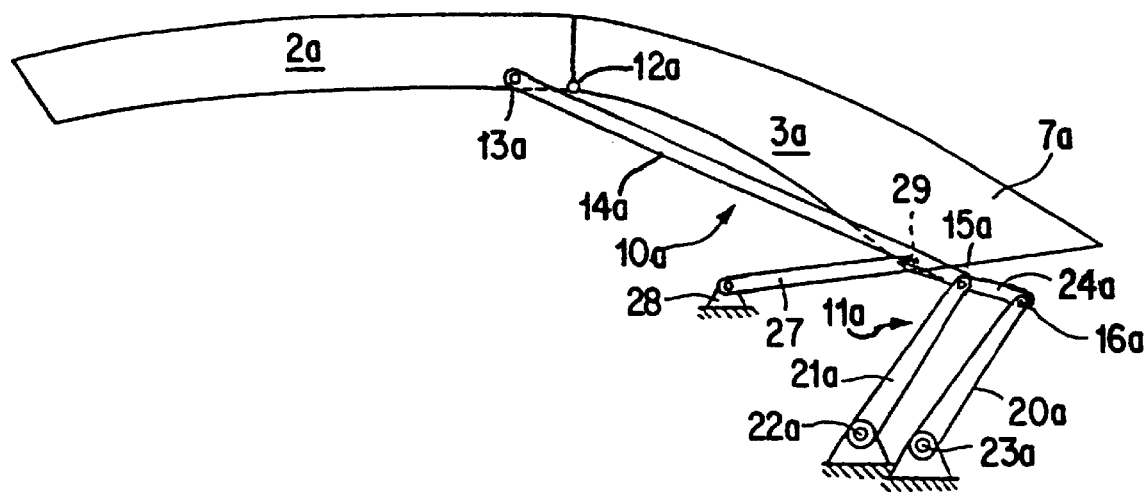
FIG. 8 is a schematic view of another embodiment of the roof construction according to the present invention in the closed operating position in which, for synchronizing the folding movements and the forward displacement movement of the roof construction, a swivel lever arrangement is provided.
Figure 9:
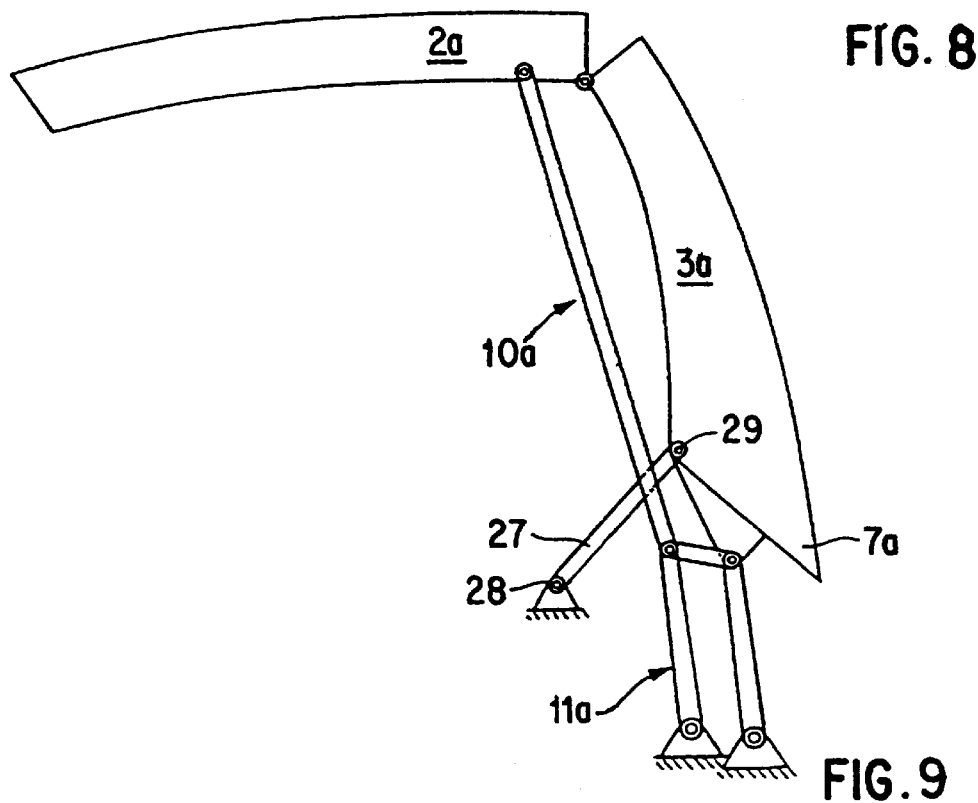
FIG. 9 is a schematic view of the roof construction according to FIG. 8 in a half-open intermediate position.
Figure 10:
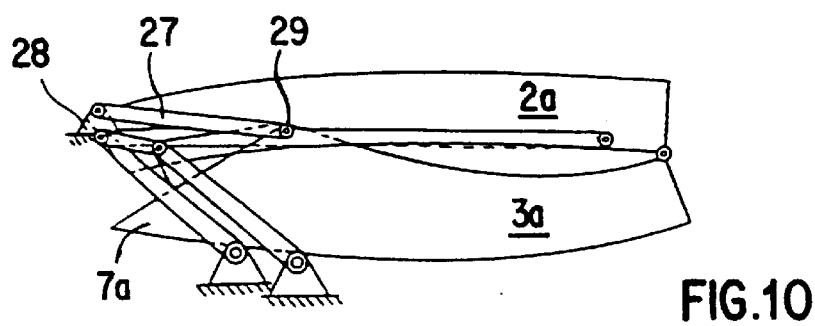
FIG. 10 is a view of the roof construction of FIGS. 8 and 9 in its folded and forward-displaced inoperative position.

The roof construction according to the embodiment of FIGS. 8 to 10 also has a forward roof part 2a and a rearward roof part 3a which is provided with rearward C-column sections 7a. An upper parallelogram linkage 10a and a lower parallelogram linkage 11a for folding the roof construction 2a, 3a and for forward displacing the roof construction 2a, 3a are also assigned to the roof construction 2a, 3a, in which case the upper parallelogram linkage 10a as well as the lower parallelogram linkage 11a correspond to the parallelogram linkages of the embodiment according to FIGS. 4 to 7. Thus the same reference numbers are used in FIGS. 8 to 10 as were used for the individual parts of the moving kinematics of FIGS. 4 to 7 while in each case only the letter a is added. That is, the parts of the parallelogram linkages 10a, 11a which are provided with the same reference numbers have functions which are identical to those of the corresponding parts of the parallelogram linkages 10 and 11 of the embodiment according to FIGS. 4 to 7.

For synchronizing the collapsing movement of the roof construction 2a, 3a with the lifting-out and the forward displacing of the roof construction 2a, 3a, however, no belt drive is provided in the embodiment according to FIGS. 8 to 10, as is the case in the embodiment according to FIGS. 4 to 7. Instead a swivel lever arrangement 27 is applied to a hinge point 29 in the area of the lower end of each C-column section of the rearward roof part 3a and with its other end area is swivellably disposed on a vehicle-fixed holding device 28.

As illustrated in FIGS. 8 to 10, during the lowering and forward-displacing operation of the roof construction 2a, 3a, the swivel lever arrangement 27 first carries out a swivel movement in the upward direction and then a swivel movement in the downward direction. Of course, the dimensions of the swivel lever arrangement 27 are adapted to the dimensions of the two parallelogram linkages 10a, 11a such that the swivel lever arrangement is integrated into the overall kinematics without causing a blockage.

Alternatively, the present invention contemplates that swivel lever arrangement 27 is additionally used for the restrictedly controlled opening and closing of a covering flap of the vehicle body which closes off the storage space for the roof construction 2a, 3a. By moving the swivel lever arrangement 27 up and down, the covering flap can be opening up for a short time while the lower parallelogram linkage 11a rotates toward the front.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof construction for a motor vehicle comprising a dimensionally stable forward roof part which, in a closed operating position thereof, adjoins a windshield frame of a body of the vehicle, a dimensionally stable rearward roof part configured to form C-column sections and be provided with a rear window, the forward and rear roof parts being swivellably connected with one another, a control mechanism for moving the forward and rear roof parts between a lowered inoperative position and a closed operative position, the rearward roof part, in the lowered inoperative position thereof, being swivelled about a horizontal transverse axis such that rearward ends of the C-column sections, as viewed in a longitudinal direction of the motor vehicle, have free ends which project toward the front of the motor vehicle, wherein, at least in the lowered inoperative position of the C-column sections, at least along a portion of the length of the C-column sections, starting from the rearward ends thereof, wherein the free ends of the C-column sections are free of transverse connection therebetween, and control devices for forward displacement of the rearward roof part in the longitudinal direction are operatively arranged such that, in the inoperative position, the C-column sections at least partially laterally flank a rear area of an interior portion of the motor vehicle.

2. The roof construction according to claim 1, wherein the rear window is configured as a transverse connection in the lower ends of the C-column sections and is separably arranged on the rearward roof part with respect to the C-column sections.

3. The roof construction according to claim 1, wherein the rear window is operatively arranged to be at least partially recessed with respect to the C-column sections on the rearward roof part, and the C-column sections project freely along at least a portion of a length thereof.

4. The roof construction according to claim 1, wherein an upper parallelogram linkage is operatively arranged to lower the forward and the rearward roof part from the closed operative position thereof, and two lower bearing points of the upper parallelogram linkage are part of a lower guiding arrangement fixedly supported on the vehicle body.

5. The roof construction according to claim 4, wherein the lower guiding arrangement is a parallelogram linkage.

6. The roof construction according to claim 5, wherein the upper and the lower parallelogram linkage are provided on each side of the roof parts with identical linkage parts to which synchronizing devices are assigned for synchronizing movement of the linkage parts.

7. The roof construction according to claim 4, wherein devices are operatively arranged between the upper and the lower parallelogram linkage for synchronous superimposing of movements of the two parallelogram linkages and restricted guiding.

8. The roof construction according to claim 4, wherein a swivel lever arrangement is applied to the rearward roof part and is fixedly disposed on the vehicle is provided as a restricted guiding device.

* * * * *